United States Patent
Nishida et al.

(10) Patent No.: US 7,808,523 B2
(45) Date of Patent: Oct. 5, 2010

(54) LANE BOUNDARY DETECTOR

(75) Inventors: Makoto Nishida, Toyota (JP); Akihiro Watanabe, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1533 days.

(21) Appl. No.: 11/135,442

(22) Filed: May 24, 2005

(65) Prior Publication Data

US 2005/0270374 A1    Dec. 8, 2005

(30) Foreign Application Priority Data

Jun. 2, 2004    (JP) .............................. 2004-164940

(51) Int. Cl.
*H04N 7/18* (2006.01)

(52) U.S. Cl. ...................................... 348/148

(58) Field of Classification Search .................. None
See application file for complete search history.

(56) References Cited

U.S. PATENT DOCUMENTS

| | | | | |
|---|---|---|---|---|
| 5,307,419 A | * | 4/1994 | Tsujino et al. | 382/153 |
| 5,790,403 A | * | 8/1998 | Nakayama | 701/28 |
| 6,577,334 B1 | | 6/2003 | Kawai et al. | |
| 2001/0056326 A1 | * | 12/2001 | Kimura | 701/208 |

FOREIGN PATENT DOCUMENTS

| JP | A 8-320997 | 12/1996 |
|---|---|---|
| JP | A-2000-207692 | 7/2000 |
| JP | A 2001-14595 | 1/2001 |
| JP | A 2002-312797 | 10/2002 |

OTHER PUBLICATIONS

Jochem et al., "Vision Based Intersection Navigation," Intelligent Vehicles Symposium, Proceedings of the 1996 IEEE Tokyo, Japan, pp. 391-396, XP 010209769, Sep. 19, 1996.

* cited by examiner

*Primary Examiner*—Nhon T Diep
(74) *Attorney, Agent, or Firm*—Oliff & Berridge, PLC

(57) ABSTRACT

A boundary detector includes a candidate line detecting unit that detects a candidate line of a lane boundary position drawn on a road surface based on image data of a predetermined detection time period acquired from a camera. The detector also includes a lane boundary position selecting unit that selects a lane boundary position based on the candidate line; a branch lane boundary position selecting unit that selects a lane boundary position of a branch lane that diverts from a main lane based on the candidate line; and a branch processing unit that sets a branch process mode in which the detection time period is short without using the selected lane boundary position of the branch lane when the branch lane boundary position selecting unit selects the lane boundary position of the branch lane.

12 Claims, 6 Drawing Sheets

LANE BOUNDARY DETECTOR

BACKGROUND OF THE INVENTION

1. Field of the Invention

The present invention relates to a boundary detector and a boundary detecting method that acquire image information based on an image supplied from a camera that is mounted on a vehicle and that picks up an image of a road surface, and detect a boundary drawn on the road surface based on the acquired image information.

2. Description of the Related Art

In recent years, an apparatus has been developed for picking up an image of a road surface in front of a vehicle with a camera, detecting a boundary, i.e., a white line, drawn on the road surface based on the image picked up by the camera, and automatically driving the vehicle on a lane delineated by the white line. For the realization of automatic driving, the lane must be properly detected, in other words, a detector is required for processing the image picked up by the camera to detect the lane, i.e., the white lines. Such detectors are disclosed in Japanese Patent Applications Laid-Open Nos. H08-320997, and 2001-014595, for example.

A vehicle lane detector disclosed in Japanese Patent Application Laid-Open No. H08-320997, measures a maximum value of edge point counts of an edge component that represents a straight line component, based on image information on the right and the left sides of the vehicle and immediately in front of the vehicle. The vehicle lane detector, based on the measured maximum value, recognizes that the image belongs to a dotted lane marker when the maximum value changes periodically, and that the image belongs to a solid lane marker when the maximum value remains constant. Thus, the vehicle lane detector recognizes the lane of the vehicle based on the results of recognition of the right and the left lane markers.

Another vehicle lane detector disclosed in Japanese Patent Application Laid-Open No. 2001-014595, detects white line candidate points through processing of an image captured by a video camera attached to a front part of a vehicle. The vehicle lane detector selects only the white line candidate points that are determined to be a part of a white line among all the white line candidate points, to calculate a detection ratio, and determines a type of the white line based on the detection ratio.

On an express highway, for example, a plurality of main lanes is provided together with a branch lane to guide the vehicle into a service area, an exit, or the like. The branch lanes form a V-shaped branch with the main lane and a white line for the branch is drawn so as to bend outward from the white line of the main lane. When a vehicle is running on the main lane and encounters a leftward branch, a white line detector mounted on the vehicle may mistakenly detect the white line of the branch lane as the white line of the main lane. Hence the detector must be capable of correctly distinguishing the white line of the main lane from the white line of the branch lane. Above described two patent applications do not particularly disclose techniques to prevent such inconvenience and therefore are not immune to detection error of the white lines delineating the lanes.

SUMMARY OF THE INVENTION

In view of the foregoing, an object of the present invention is to solve the above-described problem and provide a boundary detector which can properly distinguish a main lane and a branch lane to guide a vehicle along a proper lane.

A boundary detector according to one aspect of the present invention includes a camera that is mounted on a vehicle and picks up an image of a road surface; a candidate line detecting unit that detects a candidate line of a lane boundary position drawn on the road surface based on image data of a predetermined detection time period acquired from the image supplied from the camera; a lane boundary position selecting unit that selects a lane boundary position based on the candidate line of the lane boundary position detected by the candidate line detecting unit; a branch lane boundary position selecting unit that selects a lane boundary position of a branch lane that diverts from a main lane based on the candidate line of the lane boundary position detected by the candidate line detecting unit; and a branch processing unit that sets a branch process mode in which the detection time period is short without adopting the selected lane boundary position of the branch lane when the branch lane boundary position selecting unit selects the lane boundary position of the branch lane.

The branch processing unit adopts a lane boundary position which is selected before the currently selected lane boundary position of the branch lane when the branch lane boundary position selecting unit selects the lane boundary position of the branch lane.

The branch lane boundary position selecting unit recognizes the detected lane boundary position as the lane boundary position of the branch lane when one of a curvature and a pitch angle of the road calculated based on the lane boundary position are larger than predetermined values.

The candidate line detecting unit detects a candidate line of the lane boundary position based on a number of pieces of data of a candidate line which is continuously detected in a predetermined detection time, and the branch processing unit sets a shorter detection time in the branch process mode.

The candidate line detecting unit detects a candidate line of the lane boundary position based on a predetermined number of pieces of data of a candidate line, and the branch processing unit sets a smaller number of pieces of data of the candidate line.

The branch processing unit cancels the branch process mode when one of the short detection time period and a predetermined branch mode cancel time period elapses after the branch process mode is set.

A boundary detecting method according to another aspect of the present invention includes detecting a candidate line of a lane boundary position drawn on a road surface based on image data of a predetermined detection time period acquired from an image supplied from a camera that is mounted on a vehicle and that picks up the image of the road surface; selecting a lane boundary position based on the candidate line of the detected lane boundary position; selecting a lane boundary position of a branch lane that diverts from a main lane based on the candidate line of the detected lane boundary position; and setting a branch process mode in which the detection time period is short without adopting the selected lane boundary position of the branch lane when the lane boundary position of the branch lane is selected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, an exemplary embodiment of a boundary detector according to the present invention is described in detail with reference to the accompanying drawings. The present invention is not limited by the embodiment.

Figure 1:
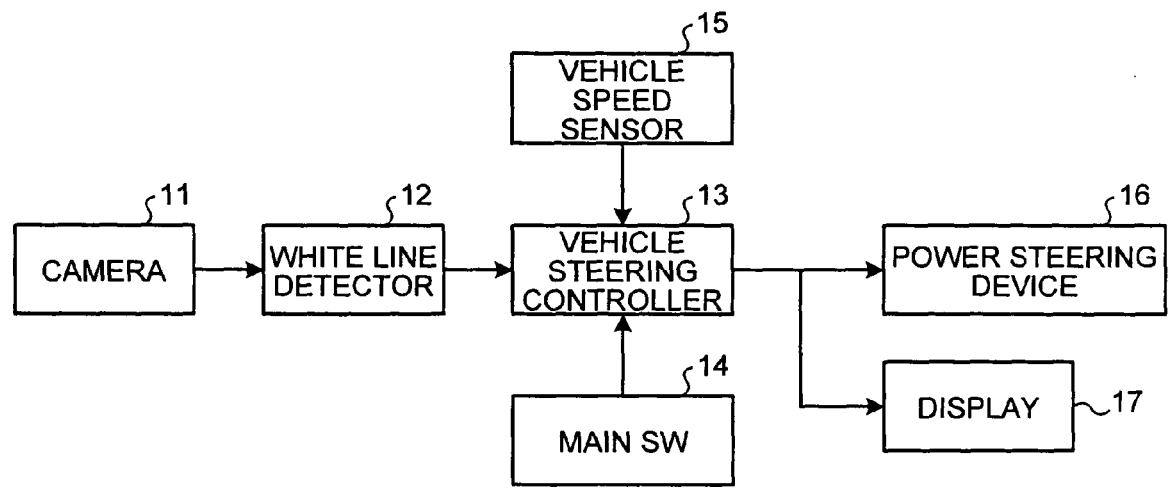
FIG. 1 is a block diagram of a structure of a vehicle controller to which a boundary detector according to an embodiment of the present invention is applied.
Figure 2:
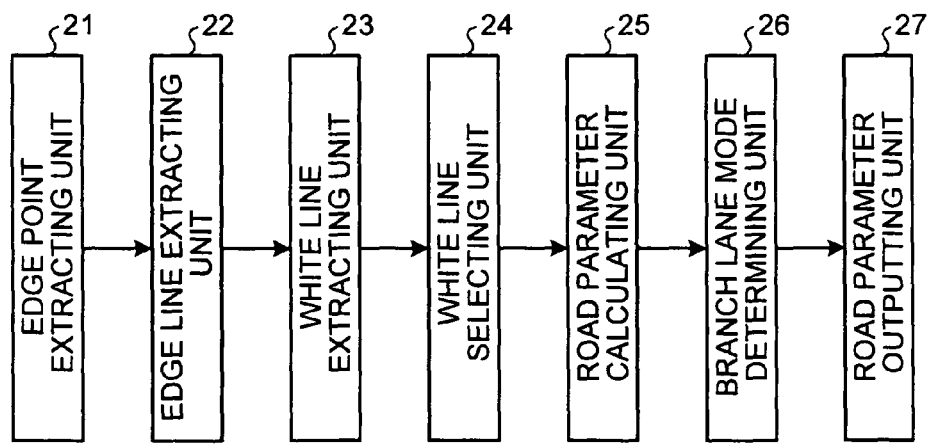
FIG. 2 is a block diagram of a structure of the boundary detector according to the embodiment.
Figure 3:
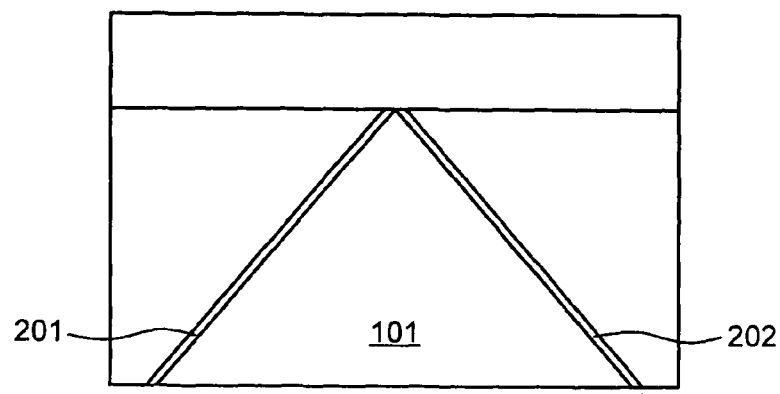
FIG. 3 is a schematic diagram of an image that is picked up by a camera.
Figure 4:
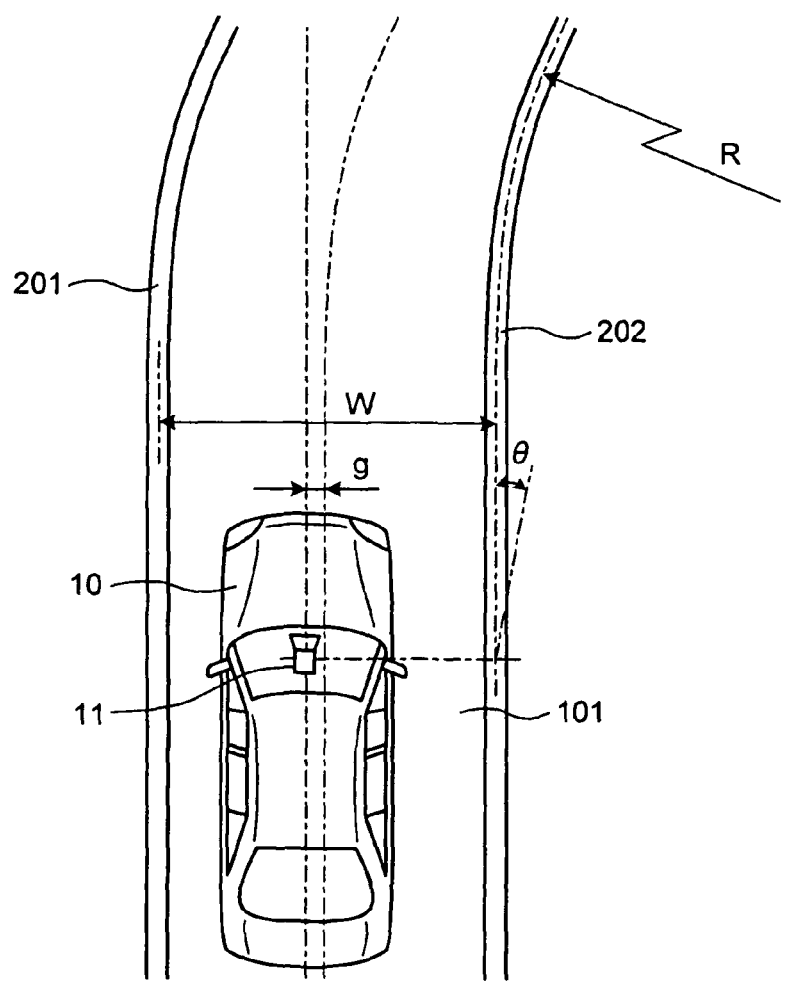
FIG. 4 is a schematic diagram of road parameters supplied as outputs from the boundary detector of the embodiment.
Figure 5:
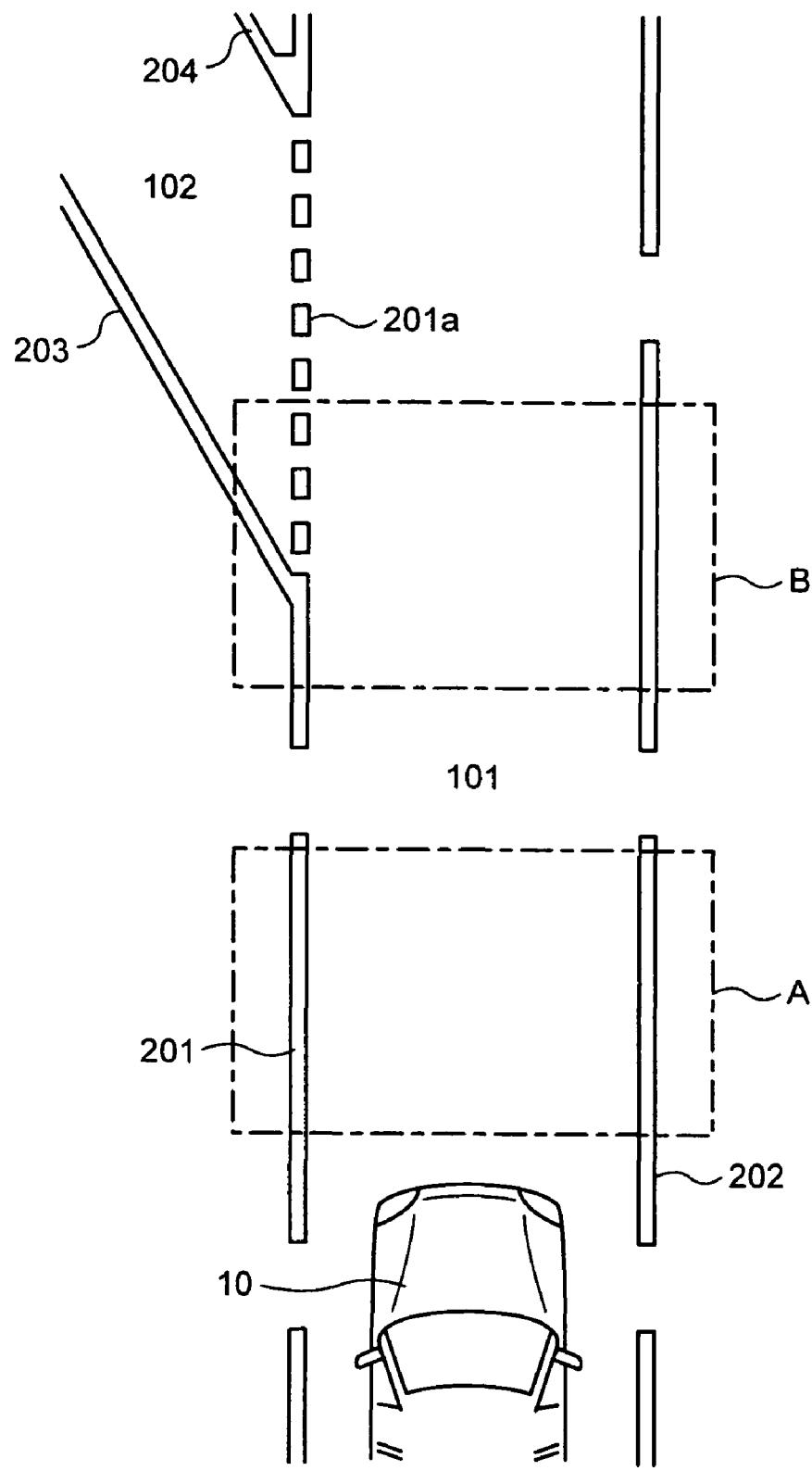
FIG. 5 is a plan view of a road that includes a main lane and a branch lane.
Figure 6A:
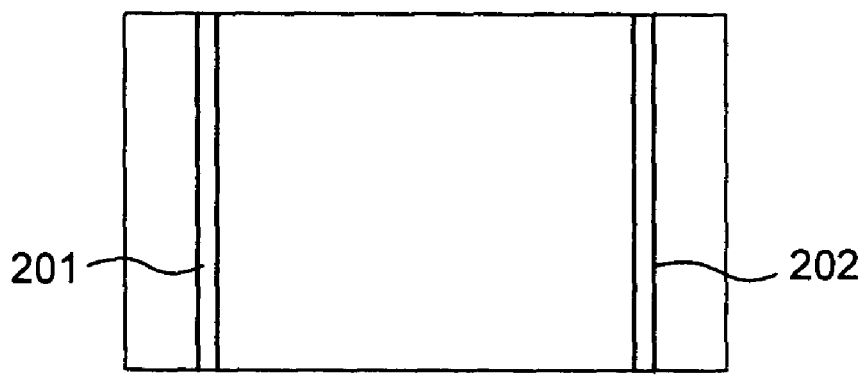
FIG. 6A is a schematic diagram of the main lane after an image processing.
Figure 6B:
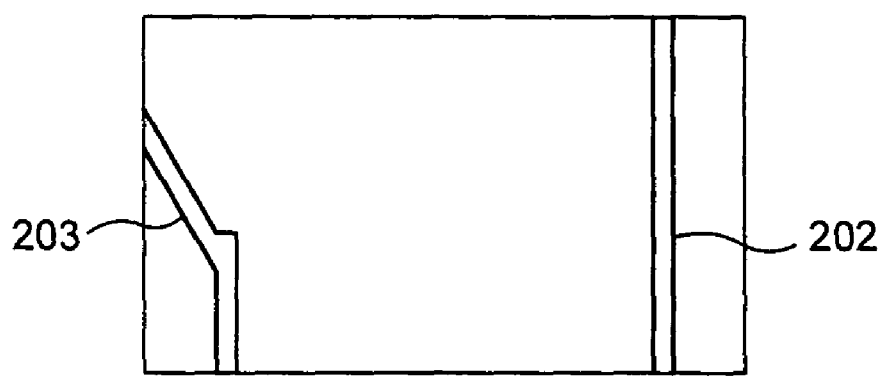
FIG. 6B is a schematic diagram of a branch section in the main lane after the image processing.
Figure 7:
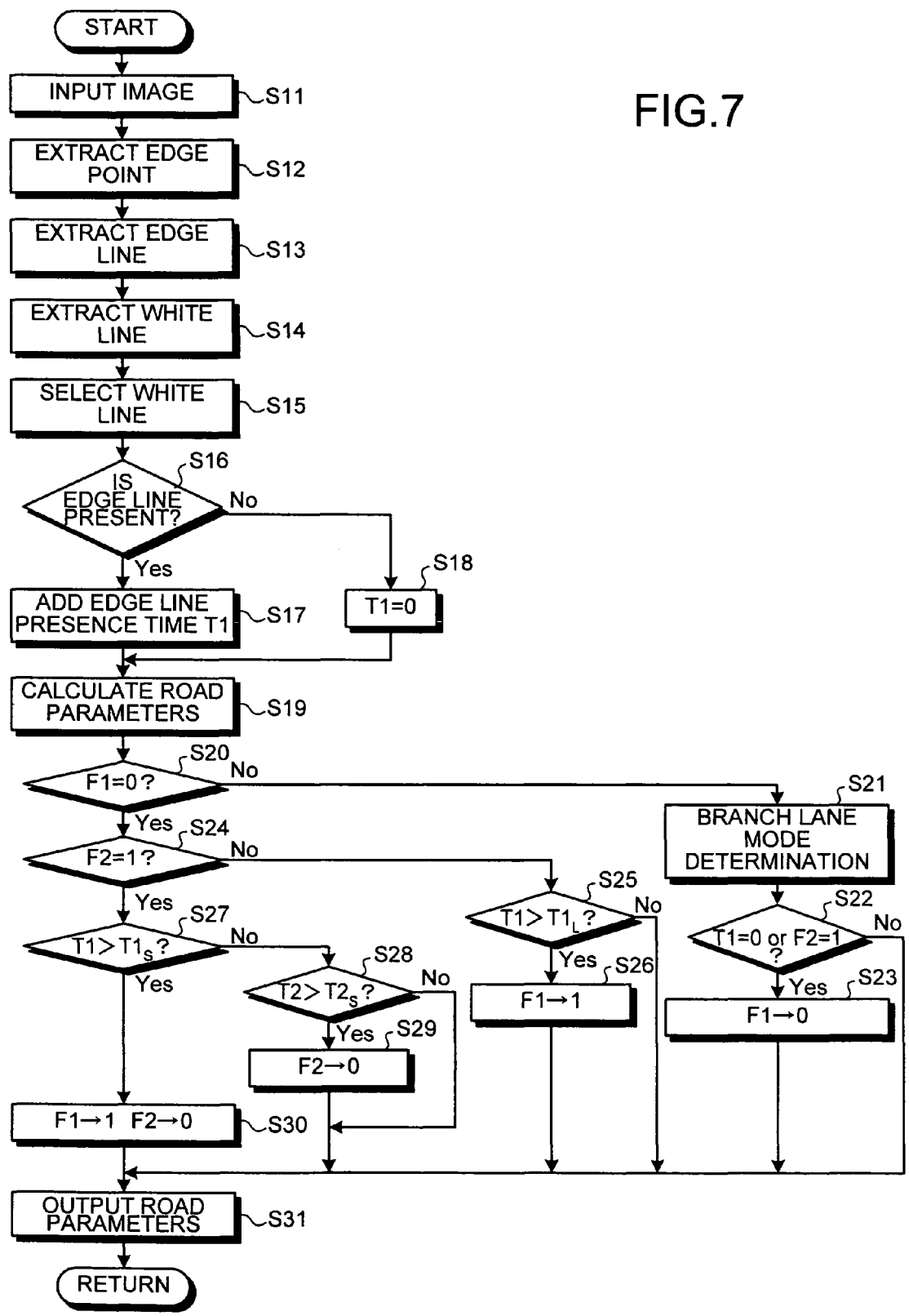
FIG. 7 is a flowchart of a boundary detection control by the boundary detector according to the embodiment.
Figure 8:
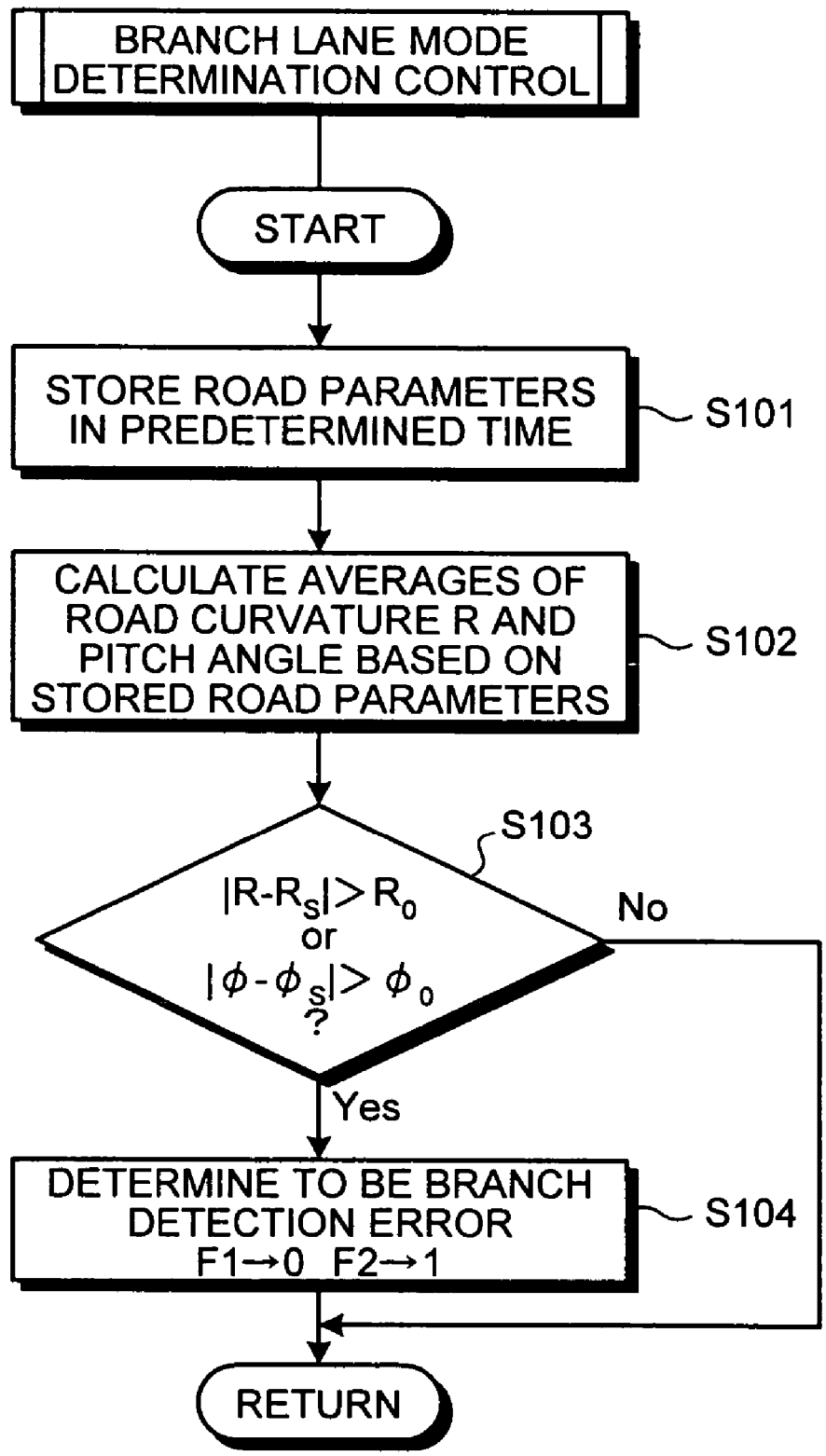
FIG. 8 is a flowchart of a branch lane mode determination process.

FIG. 1 is a block diagram of a structure of a vehicle controller to which a boundary detector according to the embodiment of the present invention is applied, FIG. 2 is a block diagram of a structure of the boundary detector of the embodiment, FIG. 3 is a schematic diagram of an image picked up by a camera, FIG. 4 is a schematic diagram of road parameters which are supplied as outputs from the boundary detector of the embodiment, FIG. 5 is a plan view of a road including a main lane and a branch lane, FIG. 6A is a schematic diagram of the main lane after an image processing, FIG. 6B is a schematic diagram of a branch section of the main lane after the image processing, FIG. 7 is a flowchart of a boundary detection control by the boundary detector of the embodiment, and FIG. 8 is a flowchart of a branch lane mode determination process.

The vehicle controller to which the boundary detector of the embodiment is applied includes, as shown in FIG. 1, a camera 11, a white line detector (boundary detector) 12, a vehicle steering controller 13, a main switch (S/W) 14, a vehicle speed sensor 15, a power steering device 16, and a display 17. The vehicle controller detects white lines on both sides of a lane on which the vehicle is running, calculates road parameters based on the white lines, and steers the vehicle based on the road parameters to properly drive the vehicle within the lane on which the vehicle is currently running.

The camera 11 is fixed at a predetermined angle of depression near a room mirror, for example, to capture an image of the road in front of the vehicle, and outputs a captured image to the white line detector 12. The camera 11 is capable of capturing an image within a range from a position predetermined distance away from the front of the vehicle up to a far position. In the image, as shown in FIG. 3, right and left white lines (boundary lines) 201 and 202, that delineate a lane 101, merge at an upper section of the image to form a reverse V shape.

The white line detector 12 detects the right and the left white lines drawn on the road surface based on the image supplied from the camera 11, and finds the road parameters based on the information of the right and the left white lines.

The white line detector 12, as shown in FIG. 2, includes an edge point extracting unit 21 that serves as a candidate line detector, an edge line extracting unit 22, a white line extracting unit 23, a white line selecting unit 24 that serves as a lane boundary position selecting unit, a road parameter calculating unit 25, a branch lane mode determining unit 26 that serves as a branch lane boundary position selecting unit and as a branch processing unit, and a road parameter outputting unit 27. The white line detector 12 conducts various processing on a planar image of the road viewed from above which is obtained through a geometric transform of the image picked up by the camera 11.

The white line detector 12 continuously processes the image supplied from the camera 11 at a predetermined sampling cycle (200 ms, for example) and recognizes a point where the brightness changes sharply along a horizontal direction, i.e., the right and left direction of the camera 11, that is perpendicular to the direction of vehicle driving, as an edge point. The edge point extracting unit 21 extracts a plurality of edge points from the image supplied from the camera 11. The edge line extracting unit 22 extracts a plurality of edge lines that are white line candidate lines (candidate lines for the boundary positions) through Hough transform, for example, from the plurality of edge points extracted by the edge point extracting unit 21. The white line extracting unit 23 extracts plural sets of white line candidate lines, each set consisting of a pair of left line and right line, from the plurality of edge lines extracted by the edge line extracting unit 22. Then the white line selecting unit 24 selects two or one white line which is most likely to be a vehicle lane from the plural sets of white line candidate lines extracted by the white line extracting unit 23.

The road parameter calculator 25 calculates five road parameters, i.e., a road curvature R, a pitch angle of the vehicle $\phi$, a yaw angle $\theta$, a lane width W, and an offset g based on the two selected white lines. As shown in FIG. 4, when the vehicle 10 is running on the lane 101 delineated by left and right white lines 201 and 202, the road curvature R is an average of the curvatures of the left and the right white lines 201 and 202, and takes a positive value when the lines bend rightward of the running direction of the vehicle 10 and takes a negative value when the lines bend leftward of the running direction of the vehicle 10. The pitch angle $\phi$ is an inclination angle of the vehicle, i.e., an angle formed by an optical axis of the camera 11 with respect to the road surface, and is calculated based on the inclination angles of the left and the right white lines 201 and 202 after the transform into the planar image. Provided that the pitch angle $\phi$ is zero when the vehicle 10 stops in a parallel state with the road surface, the left and the right white lines 201 and 202 in the planar image are parallel with each other. On the other hand, when the front part of the vehicle tilts downwards, the left and the right white lines 201 and 202 in the planar image come to take a shape of a reverse V, whereas when the front part of the vehicle tilts upwards, the left and the right white lines 201 and 202 in the planar image come to take a shape of V. Hence, the pitch angle $\phi$ can be calculated based on the angles of the white lines 201 and 202. The yaw angle $\theta$ is an average value of a deflection angles of the left and the right white lines 201 and 202 with respect to the driving direction of the vehicle 10 viewed from a fixed position of the camera 11, and takes a positive value when the deflection is rightward of the vehicle 10 and a negative value when deflection is leftward of the vehicle 10. The lane width W is a distance between the left and the right white lines 201 and 202. The offset g is a shift between the center of the road 101 and the center of the vehicle 10, and takes a positive value when the vehicle 10 shifts rightward on the lane 101 and takes a negative value when the vehicle 10 shifts leftward on the lane 101.

The branch lane mode determining unit 26 selects a white line of a branch lane that is diverting from a main lane from the plural sets of white line candidate lines extracted by the white line extracting unit 23 (as the branch lane boundary position selecting unit), sets a branch lane mode (branch process mode) upon selection of the white line of the branch lane, to adopt the white lines previously selected by the white line selecting unit 24 and to set a shorter detection period (as the branch processing unit).

Generally on the express highway, for example, to provide a branch lane 102 for exit from the main lane 101 which is delineated by the left and the right white lines 201 and 202, two branch white lines 203 and 204 diverting from the left white line 201 are drawn and the white line 201 is partly drawn as a dotted line 201a as shown in FIG. 5. When the vehicle 10 is running on a road where the branch lane 102 is provided on the left side of the main lane 101, and the white line detector 12 conducts an image processing on an image captured by the camera 11 in an process area A, two parallel white lines 201 and 202 can be detected as shown in FIG. 6A. On the other hand, when the white line detector 12 conducts the image processing on the image captured by the camera 11 in an process area B, though the right side white line 202 can be detected, the left side dotted white line 201a cannot be detected and instead the branch white line 203 which is more clearly drawn than the white line 201a is detected as shown in FIG. 6B. Hence, the vehicle 10 may not be properly driven along the main lane 101 on which the vehicle is currently running.

Hence, the branch lane mode determining unit 26, on determining that one of two white lines selected from the plural sets of white line candidate lines extracted by the white line extracting unit 23 is either one of the white lines 203 and 204 of the branch lane 102, does not apply the road parameters calculated based on the data of the selected branch white lines 203 and 204 and instead adopts the road parameter calculated based on data of the previously selected white lines, i.e., the white lines 201 and 202 of the main lane 101. In this case, the selected two white lines are determined to be the white lines of the branch lane when the road curvature R and the pitch angle φ of the vehicle calculated by the road parameter calculating unit 25 are larger than previously set respective predetermined values.

Further, when the selected white lines are determined to be the white lines of the branch lane, the process mode is switched from a normal lane mode to a branch lane mode. In the normal lane mode, a white line candidate line is recognized as a white line if the white line candidate line is continuously detected many times (ten times, for example) within a predetermined detection time period (one second, for example). On the other hand, in the branch lane mode, a shorter detection time period is set (0.2 second, for example) and the white line candidate line is recognized as a white line when the white line candidate line is continuously detected many times (two times, for example) within the short detection time period. Hence, when the selected white line is a white line of a branch lane, the selected white line is not adopted and the white line is selected based on the white line candidate line detected at the next short detection time period. Thus, after the vehicle 10 passes through the section connected to the branch lane 102 on the main lane 101, the white line of the main lane can be detected again at an earliest stage.

The road parameter outputting unit 27 serves to output to the vehicle steering controller 13, the road parameters consisting of the road curvature R, the pitch angle φ of the vehicle, the yaw angle θ, the lane width W, and the offset g, calculated by the road parameter calculating unit 25, and the results of determination by the branch lane mode determining unit 26 about the branch white line.

In addition, the vehicle steering controller 13 sets an amount of steering (steering torque) of the vehicle based on the road parameters supplied from the white line detector 12. In other words, the vehicle steering controller 13, when the lane on which the vehicle 10 is running turns to the right, determines the amount of steering necessary for the vehicle to run through the curve and controls the power steering device 16. The vehicle steering controller 13 is connected to the main switch 14 and controls the steering of the vehicle 10 when the main switch 14 is turned ON. In addition, the vehicle steering controller 13 is connected to the vehicle speed sensor 15. The vehicle steering controller 13 sets the amount of steering of the vehicle in consideration of the vehicle speed detected by the vehicle speed sensor 15. The display 17 connected to the vehicle steering controller 13 displays a control state.

Next, with reference to the flowcharts of FIGS. 7 and 8, the white line detection control conducted by the white line detector of the embodiment as described above will be described.

In the white line detection control by the white line detector 12 of the embodiment, as shown in FIG. 7, the white line detector 12 receives an image from the camera 11 at step S11, extracts the plurality of edge points based on the input image from the camera 11 at step S12, extracts the plurality of edge lines via Hough transform of the extracted plurality of edge points at step S13, extracts the plural sets of white line candidate lines from the extracted plurality of edge lines at step S14, and selects two white lines which are most likely to be lane signs from the plural sets of white line candidate lines at step S15.

At step S16, the white line detector 12 determines whether the edge line is continuously detected. When the edge line is continuously detected, the white line detector 12 counts an edge line presence time T1 at step S17, whereas when the edge line is not continuously detected, the white line detector 12 resets the edge line presence time T1 (T1=0) at step S18. Then at step S19, the white line detector 12 calculates the road curvature R, the pitch angle φ of the vehicle, the yaw angle θ, the lane width W, and the offset g as the five road parameters based on the two selected white lines.

At step S20, the white line detector 12 determines whether a detection flag F1=0. When the white line of the main lane 102 is detected, the detection flag F1=1. Then, at step S21, the white line detector executes the determination control of the branch lane mode. As shown in FIG. 8, at step S101, the road parameters (the road curvature R, the pitch angle φ of the vehicle, the yaw angle θ, the lane width W, and the offset g) of a predetermined time period (five seconds, for example) are stored in a past history buffer. Then, at step S102, with respect to the road curvature R and the pitch angle φ of the vehicle in the stored road parameters, an average $R_A$ of the road curvature R and an average φA of the pitch angle φ are calculated. Then, at step S103, it is determined whether an absolute value of the difference between the current road curvature R and the past average RA is larger than a threshold RO, and whether an absolute value of the difference between the current pitch angle φ and the past average φA is larger than a threshold φO.

When it is determined that the absolute value of the difference between the current road curvature R and the past average RA is larger than the threshold RO at step S103, it can be assumed that the current lane makes an extremely big curve toward the left (or the right). When it is determined that the absolute value of the difference between the current pitch angle φ and the past average φA is larger than the threshold φO, it can be assumed that the angle formed by the left and the right white lines is extremely large and the left and the right white lines form a reverse V shape or a V shape on the planar image, since the pitch angle is large regardless of the absence of forward/backward tilts of the vehicle. When the abnormalities of the road curvature R or the pitch angle F is thus detected, the process moves to step S104 at which the white line detection result is determined to be a detection error caused by presence of a branch and the detection flag F1 is set to zero (OFF) and the branch lane mode flag F2 is set to one (ON). On the other hand, when it is determined that the difference between the current road curvature R and the past average RA is not larger than the threshold RO, and the difference between the current pitch angle φ and the past average φA is not larger than the threshold φO, the detection flag F1 and the branch lane mode flag F2 are not changed. While the branch lane mode flag F2 is set to one, the continuation time period T2 of the branch lane mode is counted up.

In other words, in the branch lane mode determination control, it is determined whether the selected white line is the white line of the branch lane 102 based on the calculated road curvature R and the pitch angle φ of the vehicle. When the selected white line is determined to be the white line of the branch lane 102, the detection flag F1 is set to zero and the branch lane mode flag F2 is set to one. With the detection flag F1 being set to zero, the road parameters calculated based on the data of the selected branch white line 203 are not adopted. With the branch lane mode flag F2 being set to one, a shorter detection time period is set for the branch lane mode.

Thus in the branch lane mode determination control, it is determined whether the selected white line is the white line of the branch lane 102 or not, and the detection flag F1 and the branch lane mode flag F2 are set. Then, returning to FIG. 7, it is determined whether the edge line presence time T1=0 or the branch lane mode flag F2=1 at step S22. The edge line presence time T1=0 means that the white line is not detected since the white line drawn on the road surface is erased or covered with snow and unseen. When the edge line presence time T1=0 or the branch lane mode flag F2=1, it is determined to be the white line lost state or that the selected white line is the white line of the branch lane 102, and the detection flag F1 is set to zero at step S23. When neither the edge line presence time T1=0 nor the branch lane mode flag F2=1 apply, no action is taken since it is the normal lane mode and the white line is detected.

On the other hand, when the selected white line is determined to be the white line of the branch lane 102 by the branch lane mode determination control, and the detection flag F1 is set to zero and the branch lane mode flag F2 is set to one, the process returns to "START" to repeat the process from step S11 to step S19 and to determine whether the detection flag F1 is zero or not at step S20 again. Since the detection flag F1 is set to zero and the branch lane mode flag F2 is set to one at the previous branch lane mode determination, the process moves immediately from step S20 to step S24 where it is determined whether the branch lane mode flag F2 is one or not. If the selected line has been determined not to be the white line of the branch lane 102 at the branch lane mode determination control described above, the branch lane mode flag F2 is set to zero. Then, the process moves to step S25 where it is determined whether the edge line presence time T1 exceeds a predetermined reference edge line presence time, i.e., a detection time period T1L of a lost lane mode (ten seconds, for example), or not. When the edge line presence time T1 does not exceed the detection time period T1L which is set longer than a normal detection time period, the setting of the flag is left unchanged, whereas when the edge line presence time T1 exceeds the detection time period T1L, it is determined that the white line detection of the main lane 101 has been completed, and the detection flag F1 is set to one at step S26.

On the other hand, when the selected lane is determined to be the white line of the branch lane 102 at the branch lane mode determination control described above at step S24, the branch lane mode flag F2 is set to one. Then the process moves to step S27 where it is determined whether the edge line presence time T1 exceeds a predetermined reference edge line presence time, i.e., a branch lane mode detection time period T1s (0.2 second, for example) or not. When it is determined that the edge line presence time T1 does not exceed the detection time period T1s which is set shorter than a normal detection time period at step S27, the process moves to step S28.

At step S28, it is determined whether the branch lane mode continuation time T2 exceeds a predetermined continuation time T2s or not. When it is determined that the branch lane mode continuation time T2 does not exceed the predetermined reference continuation time T2s at step S28, the branch lane mode is maintained without any change, whereas when the branch lane mode continuation time T2 exceeds the predetermined continuation time T2s, branch lane mode flag F2 is set to zero at step S29 to finish the branch lane mode. On the other hand, when it is determined that the edge line presence time T1 exceeds the detection time T1s at step S27, it is determined that the white line of the main lane 101 is detected again after the passing of the branch lane 102, and the detection flag F1 is set to one and the branch lane mode flag F2 is set to zero at step S30.

Thus, through the branch lane mode determination control at step S21, when the detected white line is determined to be the white line of the main lane 101, the detection flag F1 is one and the branch lane mode flag F2 is zero, and the mode is set to the normal lane mode. In the normal lane mode, a white line candidate line is recognized as a white line when the white line candidate line is continuously detected many times (ten times, for example) in a predetermined detection time period (one second, for example). On the other hand, when the detected white line is the white line of the branch lane 102, the detection flag F1 is set to zero and the branch lane mode flag F2 is set to one, and the mode is set to the branch lane mode. In the branch lane mode, a short detection time period is set (0.2 second, for example) and a white line candidate line is recognized as a white line if the white line candidate line is continuously detected many times (twice, for example) in the short detection time period T1s. When a white line candidate line is not continuously detected by a predetermined number of times in the short detection time period T1s in the branch lane mode, or the continuation time T2 of the branch lane mode exceeds a predetermined continuation time T2s after the transition to the branch lane mode, the branch lane mode is finished and the mode is switched to the normal lane mode.

At step S31, the road parameters consisting of the calculated road curvature R, the pitch angle φ of the vehicle, the yaw angle θ, the lane width W, and the offset g, and the state of the detection flag F1 (F1=0 or F1=1) are supplied to the vehicle steering controller 13. The vehicle steering controller 13, when the detection flag F1=0 is supplied together with the data of road parameters, without adopting the supplied data of road parameters, adopts the previously supplied data of road parameters to execute the vehicle steering control, whereas when the detection flag F1=1 is supplied together with the data of road parameters, adopts the data of road parameters as they are to execute the vehicle steering control.

Thus, in the boundary detector of the embodiment, the white line candidate line drawn on the road surface is detected based on the image information derived from an image captured by the camera 11 in a predetermined detection time period. The white lines 201 and 202 of the main lane 101 and the branch white line 203 of the branch lane 102 diverting from the main lane 101 are selected based on the white line candidate line. When the branch white line 203 of the branch lane 102 is selected, it is determined to be the detection error and the mode is set to the branch lane mode. In the branch lane mode, the data of the white line selected as the branch white line 203 is not adopted and instead the previously selected white lines 201 and 202 of the main lane 101 are adopted as white line data, and a shorter detection time is set for the white line detection.

Hence, when the detected white line is the branch white line 203, it is determined to be the branch detection error and the steering control (lane keep control) based on the detected data is not performed, and the steering control (lane keep control) is maintained based on the data of white lines 201 and 202 of the main lane 101 detected before the branch detection error. Thus, the vehicle 10 can remain on the main lane 101 to properly maintain the driving without being distracted by the branch lane 102. When the branch lane mode is set after the branch detection error, a shorter detection time period for the white line detection is set, and the vehicle 10 can detect the white lines 201 and 202 of the main lane 101 at an early stage after the passing of the branch lane 102 and the vehicle 10 can continue to drive properly.

Further, when a predetermined number of white line candidates are not continuously detected in a short detection time period T1s in the branch lane mode, or when the continuation time T2 after the transition to the branch lane mode exceeds the predetermined continuation time T2s, the branch lane mode is finished to return to the normal lane mode. Thus, the branch lane mode with a shorter detection time is prevented from being maintained for a long time and the detection error of the white line can be prevented from being caused by detection noise.

Further, whether the detected white line is the white lines 201 and 202 of the main lane 101 or not, or the white lines 203 and 204 of the branch lane 102 or not are determined based on the road curvature R or the pitch angle $\phi$. Since the road parameters are supplied from the white line detector itself, a separate detector is not necessary, whereby a simple apparatus and control program can be realized.

In the foregoing, detection is performed on the detection time period basis. In the normal lane mode, a white line candidate line is recognized as the white line if the white line candidate line is continuously detected many times (ten times for example) in a predetermined detection time period (one second, for example). In the branch lane mode, a shorter detection time period (0.2 second, for example) is set and a white line candidate line is recognized as a white line if the white line candidate line is continuously detected many times (twice, for example) in the short detection time period. The above is not a limiting example. The detection condition may be set according to the number of detected pieces of data. A line may be recognized as the white line when a predetermined number of pieces of data are continuously detected. A large number of pieces of data may be set for the normal lane mode whereas a small number may be set for the branch lane mode.

Further, in the embodiment, the branch lane boundary position selecting unit is provided as the branch lane mode determining unit 26, and the selected two white lines are determined to be the white line 203 of the branch lane 102 when the calculated road curvature R and the pitch angle $\phi$ of the vehicle are larger than respective predetermined values. The selected white lines, however, may be determined to be the white line 203 of the branch lane 102 when the road curvature R and the pitch angle $\phi$ of the vehicle are larger than the respective predetermined values. The determination may be made based on some values corresponding to the road curvature R or the pitch angle $\phi$. Still further, the determination of the branch lane 102 may be performed in a different manner. In the branch lane 102, the white line 203 bends at a certain angle from the white line 201 of the main lane 101. The shape of the white line may be previously stored to be compared with the detected white line to determine whether the detected line is the white line 203 of the branch lane 102 or not. Still further, when a specific shape of the branch lane 102 is to be stored, a V-shape formed by the branch white line 203 and the main lane dotted line 201a immediately before the branch point of the branch lane 102, or a V-shape formed by the branch white line 204 and the main lane white line 201 immediately after the branch point of the branch lane 102 may be stored.

In the embodiment, the white line detector 12 calculates the road parameters based on the detected white line. On receiving the road parameters together with the detection flag F1, the vehicle steering controller 13 adopts the previously received road parameters without adopting the newly received road parameters when the detection flag F1=0, whereas the vehicle steering controller 13 adopts the newly received road parameters when the detection flag F1=1. This is, however, not a limiting example. For example, when the detected white line is determined to be the white lines 203 and 204 of the branch lane 102, the white line detector 12 may not calculate the road parameters, or may output the road parameters previously calculated based on the previously selected white lines 201 and 202 of the main lane 101 instead of the newly calculated road parameters.

Still further, in the embodiment, it is described how the white line is detected on an express highway where the branch lane 102 is diverting leftward from the main lane 101. The white line detector of the present invention, however, is applicable to the express highway where a branch lane is diverting rightward from the main lane 101, and is not limited to the use on express highways.

As can be seen from the foregoing, the boundary detector according to the embodiment of the present invention, on detecting the lane boundary position of the branch lane, adopts a lane boundary position which is previously detected and sets a shorter detection time period. The boundary detector of the present invention is useful as any boundary detectors regardless of the types of the roads to be detected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A boundary detector comprising:
a camera that is mounted on a vehicle and picks up an image of a road surface;
a candidate line detecting unit that detects a candidate line of a lane boundary position drawn on the road surface based on image data of a predetermined detection time period acquired from the image supplied from the camera;

a lane boundary position selecting unit that selects a lane boundary position based on the candidate line of the lane boundary position detected by the candidate line detecting unit;

a branch lane boundary position selecting unit that selects a lane boundary position of a branch lane that diverts from a main lane based on the candidate line of the lane boundary position detected by the candidate line detecting unit; and a branch processing unit that sets a branch process mode in which the candidate line of the lane boundary position is detected based on image data of a detection time period that is shorter than the predetermined detection time period without adopting the selected lane boundary position of the branch lane when the branch lane boundary position selecting unit selects the lane boundary position of the branch lane.

2. The boundary detector according to claim 1, wherein the branch processing unit adopts a lane boundary position which is selected before the currently selected lane boundary position of the branch lane when the branch lane boundary position selecting unit selects the lane boundary position of the branch lane.

3. The boundary detector according to claim 1, wherein the branch lane boundary position selecting unit recognizes the detected lane boundary position as the lane boundary position of the branch lane when one of a curvature and a pitch angle of the road calculated based on the lane boundary position are larger than predetermined values.

4. The boundary detector according to claim 1, wherein
the candidate line detecting unit detects a candidate line of the lane boundary position based on a number of pieces of data of a candidate line which is continuously detected in a predetermined detection time, and
the branch processing unit sets a shorter detection time in the branch process mode.

5. The boundary detector according to claim 1, wherein the candidate line detecting unit detects a candidate line of the lane boundary position based on a predetermined number of pieces of data of a candidate line, and
the branch processing unit sets a smaller number of pieces of data of the candidate line.

6. The boundary detector according to claim 1, wherein the branch processing unit cancels the branch process mode when one of the short detection time period and a predetermined branch mode cancel time period elapses after the branch process mode is set.

7. A boundary detecting method comprising:
detecting a candidate line of a lane boundary position drawn on a road surface based on image data of a predetermined detection time period acquired from an image supplied from a camera that is mounted on a vehicle and that picks up the image of the road surface;
selecting a lane boundary position based on the candidate line of the detected lane boundary position;
selecting a lane boundary position of a branch lane that diverts from a main lane based on the candidate line of the detected lane boundary position; and
setting a branch process mode in which the candidate line of the lane boundary position is detected based on image data of a detection time period that is shorter than the predetermined detection time period without adopting the selected lane boundary position of the branch lane when the lane boundary position of the branch lane is selected.

8. The boundary detecting method according to claim 7, wherein setting of the branch process mode includes adopting a lane boundary position which is selected before the currently selected lane boundary position of the branch lane when the lane boundary position of the branch lane is selected.

9. The boundary detecting method according to claim 7, wherein selecting of the lane boundary position of the branch lane includes recognizing the detected lane boundary position as the lane boundary position of the branch lane when one of a curvature and a pitch angle of the road calculated based on the lane boundary position are larger than predetermined values.

10. The boundary detecting method according to claim 7, wherein
detecting of the candidate line includes detecting a candidate line of the lane boundary position based on a number of pieces of data of a candidate line which is continuously detected in a predetermined detection time, and
setting of the branch process mode includes setting a shorter detection time in the branch process mode.

11. The boundary detecting method according to claim 7, wherein detecting of the lane boundary position includes detecting a candidate line of the lane boundary position based on a predetermined number of pieces of data of a candidate line, and setting of the branch process includes setting a smaller number of pieces of data of the candidate line.

12. The boundary detecting method according to claim 7, wherein setting of the branch process includes canceling the branch process mode when one of the short detection time period and a predetermined branch mode cancel time period elapses after the branch process mode is set.

* * * * *